US012785450B2

(12) United States Patent
Chieng et al.

(10) Patent No.: US 12,785,450 B2
(45) Date of Patent: Nov. 3, 2026

(54) WIRELESS CHARGING RECEIVING DEVICE

(71) Applicant: NATIONAL YANG MING CHIAO TUNG UNIVERSITY, Hsinchu City (TW)

(72) Inventors: Wei-Hua Chieng, Hsinchu City (TW); Edward Yi Chang, Hsinchu City (TW); Daisuke Ueda, Hsinchu City (TW); Chih-Chiang Wu, Hsinchu City (TW); Ching-Yao Liu, Hsinchu City (TW); Yueh-Tsung Shieh, Hsinchu City (TW); Hsien-Chung Tang, Hsinchu City (TW)

(73) Assignee: NATIONAL YANG MING CHIAO TUNG UNIVERSITY, Hsinchu City (TW)

( * ) Notice: Subject to any disclaimer, the term of this patent is extended or adjusted under 35 U.S.C. 154(b) by 35 days.

(21) Appl. No.: 18/645,799

(22) Filed: Apr. 25, 2024

(65) Prior Publication Data

US 2025/0273994 A1 Aug. 28, 2025

(30) Foreign Application Priority Data

Feb. 27, 2024 (TW) ................................ 113106949

(51) Int. Cl.
*H02J 50/12* (2016.01)
*H02M 1/42* (2007.01)

(52) U.S. Cl.
CPC .......... *H02J 50/12* (2016.02); *H02M 1/4283* (2021.05)

(58) Field of Classification Search
CPC ....................................................... H02J 50/12
See application file for complete search history.

(56) References Cited

U.S. PATENT DOCUMENTS

| | | | | |
|---|---|---|---|---|
| 2010/0056098 A1* | 3/2010 | Kanno | H02J 50/12 | 455/343.1 |
| 2018/0102675 A1* | 4/2018 | Wheeland | H02M 7/06 | |
| 2019/0148981 A1* | 5/2019 | Mao | H02J 7/04 | 307/104 |
| 2019/0312460 A1* | 10/2019 | Van Boheemen | H02M 7/217 | |

* cited by examiner

*Primary Examiner* — Daniel Kessie
(74) *Attorney, Agent, or Firm* — MUNCY, GEISSLER, OLDS & LOWE, P.C.

(57) ABSTRACT

A wireless charging receiving device includes: a battery, a receiving coil, a first capacitor, a second capacitor, a clamping diode and a rectifier diode. A first electrode of the first capacitor is electrically connected to a first end of the receiving coil. A first electrode of the second capacitor is electrically connected to a second electrode of the first capacitor, and s second end of the receiving coil is electrically connected to a second electrode of the second capacitor. A cathode of the clamping diode is electrically connected to the first electrode of the first capacitor, and an anode of the clamping diode is electrically connected to the second electrode of the first capacitor. An anode of the rectifier diode is electrically connected to the cathode of the clamping diode.

8 Claims, 2 Drawing Sheets

WIRELESS CHARGING RECEIVING DEVICE

BACKGROUND

Field of Disclosure

The present disclosure relates to the technical field of wireless charging and, more particularly, to the technical field of resonant wireless charging.

Description of Related Art

With the widespread use of mobile electronic products or electric vehicles, power supply methods have become particularly important. Currently, most electronic products or electric vehicles are powered by batteries, which still need to be charged. It is known that power transmission through electric wire connections has been used for decades, but the size of electric wire and its loss limitations also cause many inconveniences. Therefore, the industry is currently devoted to the research in the transmission of power through wireless methods.

Currently, the wireless power transmission technology includes electromagnetic induction mechanism and resonant mechanism. The electromagnetic induction mechanism may only be used over short distances, while the resonant mechanism may be provided with the advantage of long distances. However, the current power transmission efficiency of the resonant mechanism is poor. Moreover, the design complexity and manufacturing cost of the resonant mechanism are higher than those of the electromagnetic induction mechanism.

Therefore, there is a need to provide an improved wireless charging receiving device to alleviate and/or obviate the above problems.

SUMMARY

The present disclosure provides a wireless charging receiving device that can be used for resonant wireless power transmission, and the circuit of the wireless charging receiving device can be mainly formed by passive components so as to greatly reduce system complexity and cost.

The wireless charging receiving device includes: a battery having a positive electrode; a receiving coil having a first end and a second end; a first capacitor having a first electrode electrically connected to the first end of the receiving coil, and a second electrode; a second capacitor having a first electrode electrically connected to the second electrode of the first capacitor, and a second electrode electrically connected to the second end of the receiving coil; a clamping diode having a cathode electrically connected to the first electrode of the first capacitor, and an anode electrically connected to the second electrode) of the first capacitor; and a rectifier diode having an anode electrically connected to the cathode of the clamping diode, and a cathode electrically connected to the positive electrode of the battery.

Other novel features of the disclosure will become more apparent from the following detailed description when taken in conjunction with the accompanying drawings.

DETAILED DESCRIPTION OF EMBODIMENT

Figure 1:
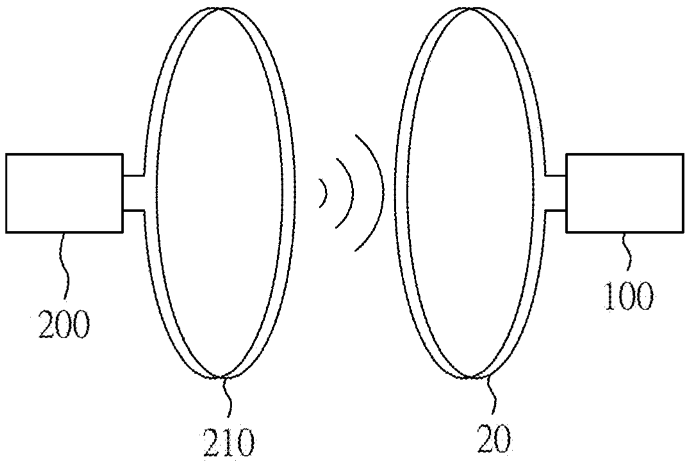
FIG. 1 shows an architecture of a wireless charging system according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that in this article, unless otherwise specified, "a" component is not limited to a single component, but may also refer to one or more components.

The ordinals recited herein such as "first", "second" and so on are intended only to describe the elements claimed and imply or represent neither that the claimed elements have any preceding ordinals, nor that sequence between one claimed element and another claimed element or between steps of a manufacturing method. The use of these ordinals is merely to differentiate one claimed element having a certain designation from another claimed element having the same designation.

In addition, the wording "adjacent" in the description and claims, for example, is used to describe being adjacent to each other, and does not necessarily mean that they are in contact with each other.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two elements, and does not limit whether there is contact between the two elements, unless specifically limited. Furthermore, when the present disclosure recites multiple effects, if the word "or" is used between the effects, it means that the effects may exist independently, but it does not exclude that multiple effects may exist at the same time.

In addition, the terms "connect" or "couple" in the description and claims not only refer to direct connection with another component, but also refer to indirect connection or electrical connection with another component. In addition, electrical connection includes direct connection, indirect connection, or communication between two components by radio signals.

In addition, in the specification and claims, the terms "almost", "about", "approximately" or "substantially" usually means within 10%, 5%, 3%, 2%, 1% or 0.5% of a given value or range. The quantity given here is an approximate quantity; that is, without specifying "almost", "about", "approximately" or "substantially", it can still imply the meaning of "almost", "about", "approximately" or "substantially". In addition, the term "range of the first value to the second value" or "range between the first value and the second value" indicates that the range includes the first value, the second value, and other values in between.

In addition, each component may be implemented as a single circuit or an integrated circuit in a suitable manner, and may include one or more active components, such as transistors or logic gates, or one or more passive components, for example, resistors, capacitors, or inductors, but not limited thereto. The components may be connected to each other in a suitable manner, for example, respectively matching the input signal and the output signal, and using one or more lines to form a series connection or a parallel connection. In addition, each component may allow input and output signals to enter and exit sequentially or in parallel. The aforementioned configurations are determined according to the actual application.

In addition, in the preset disclosure, terms such as "system", "apparatus", "device", "module", or "unit" may refer to an electronic component or a digital circuit composed of multiple electronic components, an analog circuit, or other circuits in a broader sense, and unless otherwise specified, they do not necessarily have a hierarchical relationship.

In addition, the technical features of different embodiments disclosed in the present disclosure may be combined to form another embodiment.

FIG. 1 shows an architecture of a wireless charging system according to an embodiment of the present disclosure. As shown in FIG. 1, the wireless charging system may include a wireless charging transmitting device 200 and a wireless charging receiving device 100. The wireless charging transmitting device 200 and the wireless charging receiving device 100 perform power transmission through a resonant wireless transmission mechanism. The wireless charging transmitting device 200 may include a transmitting coil 210 and may use various available mechanisms to transmit energy. The wireless charging receiving device 100 may include a receiving coil 20 for receiving energy. When the transmitting coil 210 and the receiving coil 20 reach frequency resonance, it is able to achieve resonant wireless transmission therebetween.

Figure 2:
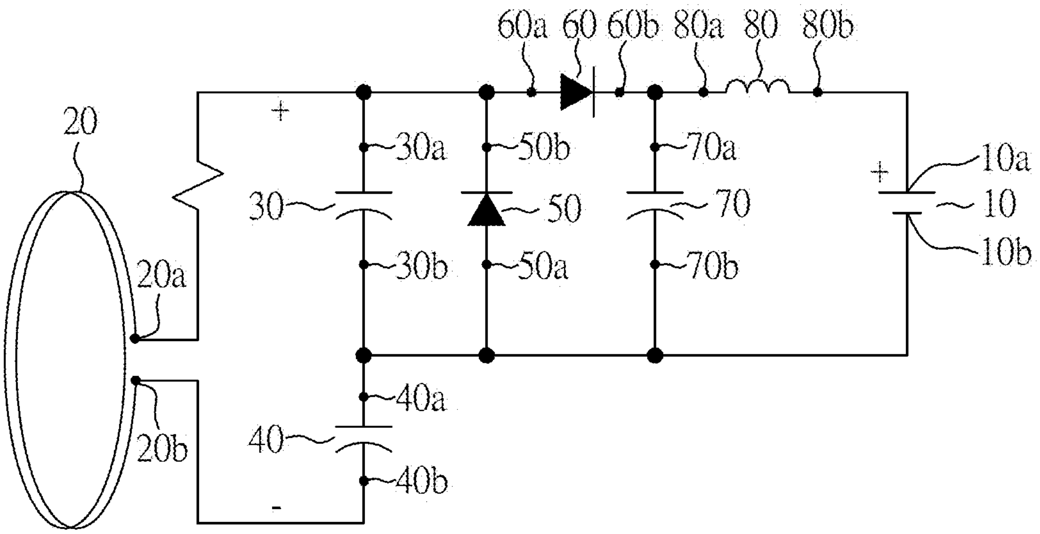
FIG. 2 shows a detailed structure of a wireless charging receiving device according to an embodiment of the present disclosure.

The present disclosure may be applied to battery charging of electric vehicles, such as charging the batteries of electric vehicles through wireless charging without using wires to connect to charging piles, or the battery does not need to obtain initial power from the electric vehicle, but it is not limited thereto. For this reason, the wireless charging receiving device 100 of the present disclosure has a special design. FIG. 2 shows a detailed structure of a wireless charging receiving device 100 according to an embodiment of the present disclosure.

As shown in FIG. 2, the wireless charging receiving device 100 may include a battery 10, a receiving coil 20, a first capacitor 30, a second capacitor 40, a clamping diode 50 and a rectifier diode 60. In one embodiment, the wireless charging receiving device 100 may further include a voltage stabilizing capacitor 70. In one embodiment, the wireless charging receiving device 100 may further include a filter inductor 80.

The battery 10 may have a positive electrode 10*a* and a negative electrode 10*b*. The receiving coil 20 may have a first end 20*a* and a second end 20*b*. The first capacitor 30 may have a first electrode 30*a* and a second electrode 30*b*. The second capacitor 40 may have a first electrode 40*a* and a second electrode 40*b*. The clamping diode 50 may have an anode 50*a* and a cathode 50*b*. The rectifier diode 60 may have an anode 60*a* and a cathode 60*b*. The voltage stabilizing capacitor 70 may have a first electrode 70*a* and a second electrode 70*b*. The filter inductor 80 may have a first end 80*a* and a second end 80*b*.

The first end 20*a* of the receiving coil 20 may be electrically connected to the first electrode 30*a* of the first capacitor 30. The second end 20*b* of the receiving coil 20 may be electrically connected to the second electrode 40*b* of the second capacitor 40. The second electrode 30*b* of the first capacitor 30 may be electrically connected to the first electrode 40*a* of the second capacitor 40. The first electrode 30*a* of the first capacitor 30 may also be electrically connected to the cathode 50*b* of the clamping diode 50. The second electrode 30*b* of the first capacitor 30 may also be electrically connected to the anode 50*a* of the clamping diode 50. The cathode 50*b* of the clamping diode 50 may also be electrically connected to the anode 60*a* of the rectifier diode 60. The cathode 60*b* of the rectifier diode 60 may be electrically connected to the positive electrode 10*a* of the battery 10.

Furthermore, in one embodiment, the first electrode 70*a* of the voltage stabilizing capacitor 70 may be electrically connected to the cathode 60*b* of the rectifier diode 60, the second electrode 70*b* of the voltage stabilizing capacitor 70 may be electrically connected to the anode 50*a* of the clamping diode 50, and the second electrode 70*b* of the voltage stabilizing capacitor 70 may also be electrically connected to the negative electrode 10*b* of the battery 10. In addition, in one embodiment, the first end 80*a* of the filter inductor 80 may be electrically connected to the cathode 60*b* of the rectifier diode 60, and the second end 80*b* of the filter inductor 80 may be electrically connected to the positive electrode 10*a* of the battery 10. That is, the rectifier diode 60 may be electrically connected to the battery 10 through the filter inductor 80, but it is not limited thereto.

Next, the details of each component will be described.

Regarding the battery 10 and the receiving coil 20, in one embodiment, the battery 10 is a rechargeable battery. In one embodiment, the battery 10 may be a battery that supplies power to electric vehicles or electronic products, but it is not limited thereto. In one embodiment, the receiving coil 20 may have a minimizing resistance $R_R$; that is, the resistance of the receiving coil 20 itself is as small as possible, for example, it may be below 0.1 ohms, while it is not limited thereto. In one embodiment, when the wireless charging receiving device 100 receives a signal of a specific signal frequency (such as a resonant frequency), the current flowing through the receiving coil 20 will generate current resonance. In one embodiment, when there is current resonance, the internal resistance and internal capacitance of the wireless charging receiving device 100 may produce a negative impedance conversion effect, with which the wireless charging receiving device 100 may be regarded as a negative impedance converter (NIC) with respect to the wireless charging transmitting device 200, wherein "negative impedance conversion" indicates that the impedance in the circuit will not consume energy and, instead, will increase the energy. Therefore, the efficiency of charging the battery 10 by the wireless charging receiving device 100 may be improved, while it is not limited thereto. In one embodiment, the specific signal frequency may be between 1 MHz (Mega Hertz) and 100 MHz (1 MHz≤specific signal frequency≤100 MHz), while it is not limited thereto. In one embodiment, the voltage of the battery 10 may be between 24 and 800 volts (24V≤battery voltage≤800V), that is, the wireless charging receiving device 100 may be suitable for charging the battery 10 with a voltage of 24V to 800V, while it is not limited thereto.

Regarding the first capacitor 30 and the second capacitor 40. In one embodiment, the first capacitor 30 may be, for example, a constant capacitor with a constant capacitance value, but it is not limited thereto. In one embodiment, the second capacitor 40 may be, for example, a variable capacitor or a varicap diode with a variable capacitance value, but it is not limited thereto. In one embodiment, by adjusting the capacitance value of the second capacitor 40, the corresponding resonant frequency of the wireless charging receiving device 100 may be adjusted, but it is not limited thereto. In addition, in one embodiment, the capacitance value of the first capacitor 30 may be greater than the capacitance value of the second capacitor 40, but it is not limited thereto. In addition, in one embodiment, the second capacitor 40 may be a capacitor characterized in withstanding high voltages and having low equivalent series resistance (ESR), such as a ceramic capacitor, a tantalum capacitor, an aluminum capacitor, an electrolytic capacitor, a film capacitor, etc., but it is not limited thereto.

Since the wireless charging receiving device 100 of the present disclosure is provided with a variable capacitor, it may be adjusted in response to different charging requirements and thus may be applied to a variety of charging scenarios. For example, it may be adjusted in response to batteries with low voltage requirements or high voltage requirements.

Regarding the clamping diode 50, in one embodiment, the clamping diode 50 may be a fast recovery diode that may withstand high voltage, such as a Schottky diode (SBD), but it is not limited thereto.

Regarding the rectifier diode 60, in one embodiment, the rectifier diode 60 may be a fast recovery diode, such as STPSC406, SS3H10HE3_B/H, S3JFSTR-ND, etc., but it is not limited thereto.

Since the wireless charging receiving device 100 of the present disclosure is provided with a Schottky diode and a fast recovery diode, it is able to ensure high performance and reliability of the system.

Through the arrangement of the above components of the wireless charging receiving device 100, it may improve the transmission efficiency of wireless transmission, reduce energy waste, and provide innovative wireless charging solutions for electronic products or electric vehicles.

Next, the operation mode of each component at the resonant frequency will be explained.

In one embodiment, when the wireless charging transmitting device 200 transmits energy, the wireless charging receiving device 100 receives energy through the receiving coil 20. At this moment, the receiving coil 20 may generate a signal, and the signal may be an AC signal. Then, the clamping diode 50 may clamp and shift the signal, that is, adjust the potential of the signal without changing the waveform of the signal, for example, shift the entire waveform of the signal to be above zero potential. Then, the rectifier diode 60 may rectify the signal. Then, the voltage stabilizing capacitor 70 may stabilize the voltage of the signal and, at this moment, the signal may form a DC signal. Then, the filter inductor 80 may filter the signal to eliminate some high-frequency surges in the signal. The signal may then be sent to the battery 10 so as to charge the battery 10. However, the present disclosure is not limited thereto.

In addition, in one embodiment, in order to achieve negative impedance conversion for wireless power transmission, the inductance value of the filter inductor 80 may be between 1 μH and 5 μH, for example, it may be 2 μH, while it is not limited thereto. In one embodiment, the capacitance value of the voltage stabilizing capacitor 70 may be between 8000 F and 12000 F, for example, it may be 10000 F, but it is not limited thereto. In one embodiment, the internal resistance value of the wireless charging receiving device 100 may be between 0.05 ohms and 0.2 ohms, such as 0.1 ohms, but it is not limited thereto. With the above parameter settings, a feedback impedance formed by the clamping diode 50, the rectifier diode 60, the voltage stabilizing capacitor 70, the filter inductor 80 and the battery 10 of the wireless charging receiving device 100 may form a negative impedance, so as to achieve negative impedance conversion for wireless power transmission.

Next, an experimental example is used to illustrate the efficacy of the present disclosure.

In this experimental example, the wireless charging transmitting device 200 includes a class E amplifier and the transmitting coil 210, and the wireless charging receiving device 100 includes the receiving coil 20 and related circuits (with reference to FIG. 2). The center of the transmitting coil 210 and the center of the receiving coil 20 are spaced apart by, for example, 50 centimeters (cm). The switch of the wireless charging transmitting device 200 is composed of, for example, three 20-millimeter (20-mm) gallium nitride (GaN) elements connected in parallel. The GaN elements are, for example, D-type gallium nitride high electron mobility transistors (GaN HEMTs), and each GaN element is capable of conducting 6 amps (A) of DC current. In this experimental example, the maximum allowable transmission power of the wireless charging transmitting device 210 is, for example, 600 watts (W). In consideration of the switching loss of the gallium nitride component, the maximum output power of the DC power supply connected to the wireless charging transmitting device 210 may be limited, for example, to 350 W, which may be achieved by setting the maximum output current of the DC power supply to 3.5 A. In addition, in this experimental example, the battery 10 of the wireless charging receiving device 100 may be composed of two 48V lithium battery packs and three 12V lead-acid battery packs that are used to simulate various electric vehicle batteries. When the above batteries are connected in series, a terminal voltage of, for example, 132V may be measured. The purpose of this experimental example is to use the wireless charging receiving device 100 to demonstrate the use of resonant wireless power transmission technology to charge the battery 10 of an electric vehicle, in which the charging current is set to 1 A, for example.

Figure 3:
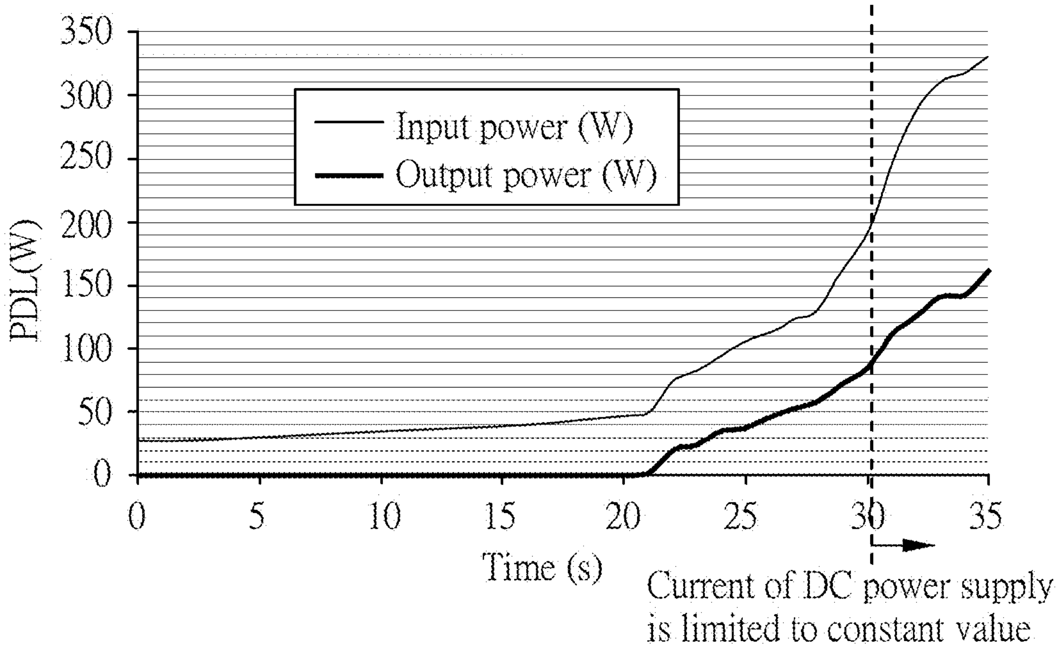
FIG. 3 is a trend chart illustrating the changes in input power and output power over time in an experimental example of the present disclosure.

FIG. 3 is a trend chart illustrating the changes in input power and output power over time in an experimental example of the present disclosure, which shows the PDL (power delivered to load) of this experimental example to the load (battery 10). As shown in FIG. 3, the wireless charging transmitting device 210 and the wireless charging receiving device 100 form good resonance at about 21 seconds. After 21 seconds, the power transmitted to the battery 10 gradually becomes unstable and gradually increases until it becomes stable at about 30 seconds (at this moment, the current of the DC power supply connected to the wireless charging transmitting device 210 has been limited to 3.5 A). The above instability phenomenon is consistent with the theory of sub-harmonic oscillation of the negative impedance converter in existing literature, thereby indicating that the wireless charging receiving device 100 in the present experimental example has the characteristics of negative impedance conversion.

Figure 4:
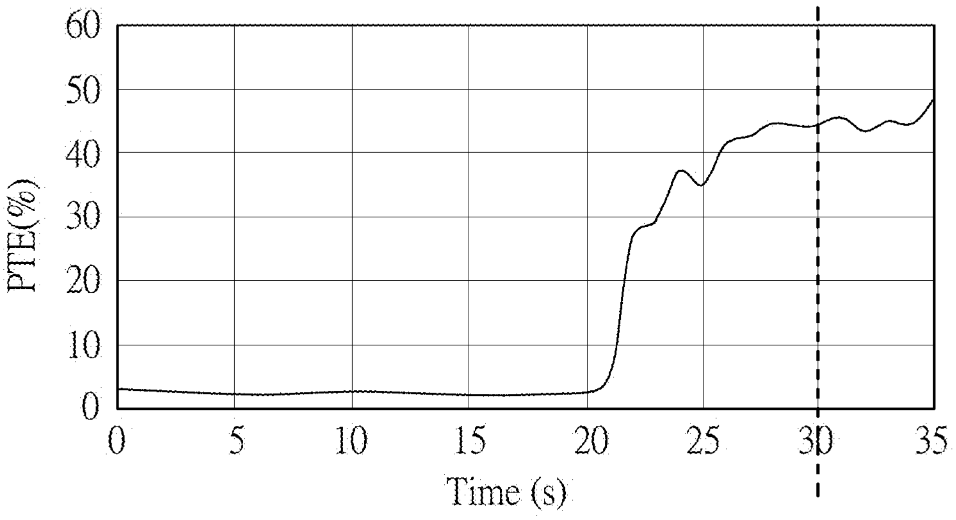
FIG. 4 is a trend chart illustrating the power transmission efficiency of the wireless charging transmitting device and the wireless charging receiving device in an experimental example of the present disclosure.

FIG. 4 is a trend chart illustrating the power transmission efficiency (PTE) of the wireless charging transmitting device 200 and the wireless charging receiving device 100 in an experimental example of the present disclosure. As shown in FIG. 4, after 21 seconds, when unstable transmission power occurs, PTE may increase synchronously. In this experiment, it shows an efficiency of 50%, which is in line with the industry-recognized power transmission efficiency requirements, and thus the present disclosure is applicable to wireless charging of electric vehicle batteries.

It is noted that the above experimental examples are for illustrative purpose only but not for limitations of the present disclosure, and the experimental values may vary due to different experimental environments.

In one embodiment, the present disclosure may at least performs a comparison on a product through mechanism observation, such as the presence or absence of components or the operational relationship between components, as a basis for determining whether the product falls within the scope of patent protection of the present disclosure, but it is not limited thereto. In one embodiment, the mechanism observation may be performed, for example, with the naked eye. In one embodiment, the mechanism observation may be achieved, for example, by using equipment such as an optical microscope or a scanning microscope, but it is not limited thereto.

As a result, the present disclosure may be suitable for wireless charging of electric vehicles or other electronic products. In addition, in terms of wireless charging technology, the present disclosure may be advantageous in long-distance transmission, use of only passive components for most of the receiver's circuits, greatly reduced manufacturing costs.

In addition, the features of the various embodiments of the present disclosure may be mixed and matched as long as they do not violate the spirit of the invention or conflict with each other.

The aforementioned specific embodiments should be construed as merely illustrative, and not limiting the rest of the present disclosure in any way.

The invention claimed is:

1. A wireless charging receiving device, comprising:

a battery having a positive electrode;

a receiving coil having a first end and a second end;

a first capacitor having a first electrode electrically connected to the first end of the receiving coil, and a second electrode;

a second capacitor having a first electrode directly connected to the second electrode of the first capacitor, and a second electrode directly connected to the second end of the receiving coil;

a clamping diode having a cathode directly connected to the first electrode of the first capacitor, and an anode directly connected to the second electrode of the first capacitor and first electrode of the second capacitor;

a rectifier diode having an anode directly connected to the cathode of the clamping diode, and a cathode electrically connected to the positive electrode of the battery; and a filter inductor disposed between the rectifier diode and the battery;

wherein the first capacitor has a capacitance value greater than that of the second capacitor;

wherein the rectifier diode is a fast recovery diode, and the clamping diode is a fast recovery diode capable of withstanding high voltage;

wherein an inductance value of the filter inductor is set within a range between 1 μH and 5 μH, and an internal resistance value of the wireless charging receiving device is set within a between 0.05 ohms and 0.2 ohms.

2. The wireless charging receiving device as claimed in claim 1, wherein the second capacitor is an equivalent series resistance capacitor capable of withstanding high voltage, and the second capacitor is a variable capacitor or a varicap diode.

3. The wireless charging receiving device as claimed in claim 1, wherein the battery has a voltage of 24 volts to 800 volts.

4. The wireless charging receiving device as claimed in claim 1, wherein the clamping diode is a Schottky diode.

5. The wireless charging receiving device as claimed in claim 1, wherein, when the wireless charging receiving device receives a specific signal frequency, current flowing through the receiving coil generates a current resonance and, when there is the current resonance, an internal resistance and an internal capacitance of the battery form a negative impedance conversion to be equivalently presented at a wireless charging transmitting device.

6. The wireless charging receiving device as claimed in claim 5, wherein the specific signal frequency is between 1 MHz and 100 MHz.

7. The wireless charging receiving device as claimed in claim 1, further comprising a voltage stabilizing capacitor having a first electrode electrically connected to the cathode of the rectifier diode, and a second electrode electrically connected to the anode of the clamping diode.

8. The wireless charging receiving device as claimed in claim 1, further comprising a filter inductor having a first end electrically connected to the cathode of the rectifier diode, and a second end electrically connected with the positive electrode of the battery.

* * * * *